United States Patent [19]
DeKraker et al.

[11] Patent Number: 5,511,759
[45] Date of Patent: Apr. 30, 1996

[54] HYDRAULIC CHAIR HEIGHT ADJUSTMENT MECHANISM

[75] Inventors: Larry DeKraker, Holland, Mich.; Richard P. Thorn, Erie, Pa.

[73] Assignee: Steelcase, Inc., Grand Rapids, Mich.

[21] Appl. No.: 249,544

[22] Filed: May 26, 1994

[51] Int. Cl.⁶ .................................................. A47C 7/00
[52] U.S. Cl. ........................... 248/575; 248/161; 248/599
[58] Field of Search .................................... 248/631, 599, 248/562, 575, 161, 414, 157; 297/344.19; 267/131, 124, 219, 64.23, 64.19, 64.27, 122, 35

[56] References Cited

U.S. PATENT DOCUMENTS

| | | |
|---|---|---|
| Re. 21,857 | 7/1941 | Herold ..................................... 248/578 |
| 3,052,328 | 9/1962 | Brueckner . |
| 3,212,768 | 10/1965 | Casimir . |
| 3,381,926 | 5/1968 | Fritz et al. . |
| 3,465,650 | 9/1969 | Gluck . |
| 3,547,394 | 12/1970 | Wehner . |
| 3,711,054 | 1/1973 | Bauer . |
| 3,722,640 | 3/1973 | Taylor . |
| 3,763,651 | 10/1973 | Okiyama . |
| 3,771,626 | 11/1973 | Palmer . |
| 3,774,895 | 11/1973 | Willich et al. . |
| 3,777,617 | 12/1973 | Okiyama . |
| 3,788,587 | 1/1974 | Stemmler . |
| 3,825,244 | 7/1974 | Bauer . |
| 3,913,901 | 10/1975 | Molders ............................. 248/631 X |
| 3,921,952 | 11/1975 | Wirges ................................ 248/631 X |
| 3,944,031 | 3/1976 | Cholet et al. . |
| 3,969,989 | 7/1976 | Maurer et al. . |
| 3,973,654 | 8/1976 | Patriquin . |
| 4,054,277 | 10/1977 | Sirven . |
| 4,060,155 | 11/1977 | Duckett . |
| 4,072,288 | 2/1978 | Wirges et al. . |
| 4,106,392 | 8/1978 | Johnson, Jr. et al. . |
| 4,113,220 | 9/1978 | Godwin et al. . |
| 4,122,923 | 10/1978 | Ellis et al. . |
| 4,139,175 | 2/1979 | Bauer . |
| 4,183,689 | 1/1980 | Wirges et al. . |
| 4,220,307 | 9/1980 | Hale . |
| 4,241,814 | 12/1980 | Masclet . |
| 4,245,826 | 1/1981 | Wirges . |
| 4,257,499 | 3/1981 | Deschner . |
| 4,310,077 | 1/1982 | Whiteside . |
| 4,386,766 | 6/1983 | Bauer et al. . |
| 4,415,135 | 11/1983 | French . |
| 4,441,644 | 4/1984 | Farian . |
| 4,445,671 | 5/1984 | Reuschenbach et al. . |
| 4,465,266 | 8/1984 | Hale . |
| 4,485,996 | 12/1984 | Beukema et al. . |
| 4,560,041 | 12/1985 | Wkossner . |
| 4,560,042 | 12/1985 | Sell et al. . |
| 4,566,565 | 1/1986 | Wicke . |
| 4,580,749 | 4/1986 | Howard . |
| 4,592,590 | 6/1986 | Slaats et al. . |
| 4,593,951 | 6/1986 | Slaats et al. . |
| 4,609,135 | 9/1986 | Elliesen . |

(List continued on next page.)

OTHER PUBLICATIONS

"The AXIS Hydropneumatic Chair Lift" by Axis Corporation, Taiwan, R.O.C., possibly by Mar. 9 or 10, 1994.

Primary Examiner—Karen J. Chotkowski
Attorney, Agent, or Firm—Price, Heneveld, Cooper, DeWitt & Litton

[57] ABSTRACT

An adjustment mechanism for adjusting the height of a chair seat, table top or the relative position of other items includes an outer support tube and a telescoping, column tube subassembly. The column tube subassembly includes an inner support tube, a cylinder and a piston and piston rod subassembly. The piston rod is connected to the piston at one end and to the outer support tube at the other end. An elastomeric sleeve surrounds the cylinder. A valve controls flow of hydraulic fluid from the interior of the cylinder to and from an expandable chamber defined by the elastomeric sleeve. The piston snap-fits onto the piston rod and allows rotation of the column tube subassembly with respect to the outer support tube. A shock-absorbing element is disposed in the cylinder.

73 Claims, 6 Drawing Sheets

U.S. PATENT DOCUMENTS

| | | |
|---|---|---|
| 4,621,868 | 11/1986 | Slaats et al. . |
| 4,624,346 | 11/1986 | Katz . |
| 4,647,026 | 3/1987 | Siemann et al. . |
| 4,666,378 | 5/1987 | Ogawa . |
| 4,697,674 | 10/1987 | Tangorra . |
| 4,702,356 | 10/1987 | Katz et al. . |
| 4,720,068 | 1/1988 | Tornero . |
| 4,742,898 | 5/1988 | Lee . |
| 4,756,496 | 7/1988 | Hosan et al. . |
| 4,784,362 | 11/1988 | Wang . |
| 4,826,094 | 5/1989 | Whiteley . |
| 4,832,162 | 5/1989 | Bacardit . |
| 4,834,088 | 5/1989 | Jeanson . |
| 4,838,392 | 6/1989 | Miller et al. . |
| 4,858,733 | 8/1989 | Noguchi et al. . |
| 4,877,226 | 10/1989 | Taylor . |
| 4,899,969 | 2/1990 | Bauer et al. . |
| 4,963,442 | 10/1990 | Marianowski et al. . |
| 4,964,015 | 10/1990 | Crooker et al. ............... 297/344.19 X |
| 4,979,718 | 12/1990 | Bauer et al. . |
| 4,997,150 | 3/1991 | Mardollo . |
| 5,037,132 | 8/1991 | Borlinghaus et al. . |
| 5,073,351 | 1/1992 | Gualtieri . |
| 5,090,770 | 2/1992 | Heinrichs et al. . |
| 5,109,963 | 5/1992 | Husted et al. . |
| 5,113,980 | 5/1992 | Furrer et al. . |
| 5,120,011 | 6/1992 | Mintgen et al. ............... 297/344.19 X |
| 5,137,125 | 8/1992 | Troltsch et al. . |
| 5,148,896 | 9/1992 | Ralph . |
| 5,176,355 | 1/1993 | Carter . |
| 5,178,241 | 1/1993 | Aubry . |
| 5,234,187 | 8/1993 | Teppo et al. . |
| 5,263,674 | 11/1993 | Huang . |
| 5,284,312 | 2/1994 | Dony . |

HYDRAULIC CHAIR HEIGHT ADJUSTMENT MECHANISM

BACKGROUND OF THE INVENTION

The present invention relates to actuators and, more particularly, to adjustment mechanisms usable as height adjusters in a variety of articles including furniture.

Various forms of telescoping actuators are presently available for supporting and/or adjusting the position of two different elements. In furniture applications, such actuators are used with chairs, tables, work surfaces and the like. Currently available actuators include hydraulic, pneumatic, pressurized gas or mechanical devices.

In the seating area, actuators or support columns are used to set the vertical height of the seat and adjust the seating to the user and/or the task. Examples of mechanical actuators may be found in U.S. Pat. No. 4,709,894 entitled SLIP CONNECTOR FOR WEIGHT ACTUATED HEIGHT ADJUSTERS, which issued on Dec. 1, 1987, to Knoblock et al. and U.S. Pat. No. 5,234,187 entitled CHAIR HEIGHT ADJUSTMENT MECHANISM, which issued on Oct. 10, 1993, to Teppo et al. The adjuster of U.S. Pat. No. 4,709,894 is functional when the seat is unoccupied. The actuator disengages when the seat is occupied to permit the seat to swivel on the base without an effect on the seat height. The adjustment mechanism of U.S. Pat. No. 5,234,187 includes telescoping outer, intermediate and inner tubes and a drive which extends the telescoping tubes to adjust the height of the load. In one form, the drive includes a flexible, substantially nonelastic tape. A piston/cylinder gas spring or actuator is also included to extend the tubes.

Examples of pneumatic adjustment mechanisms and hydraulic or combination pneumatic/hydraulic adjustment mechanisms may be found in U.S. Pat. No. 3,381,926 entitled ADJUSTABLE STOOL, which issued on May 7, 1968, to Fritz et al; U.S. Pat. No. 4,139,175 entitled HEIGHT-ADJUSTABLE CHAIR OR TABLE PEDESTAL, which issued on Feb. 13, 1979, to Bauer; U.S. Pat. No. 4,445,671 entitled GAS SPRING INCLUDING HYDRAULIC LOCKING MEANS, which issued on May 1, 1984, to Reuschenbach et al; and U.S. Pat. No. 4,997,150 entitled ADJUSTABLE OLEOPNEUMATIC SUPPORT, which issued on Mar. 5, 1991, to Mardollo.

Extendable adjustment mechanisms, especially those used in the furniture industry, need to provide for varying loads, stability, shock absorbency, fine height adjustment, controlled movement, appropriate ranges of travel, accommodate swivel action and be reliable with reasonable service lives. Achieving these desirable ends results in compromises in presently existing systems, undue complexity or high costs.

Prior pneumatic or gas actuators operate at relatively high pressures. The high gas pressures and operating characteristics result in leakage or seal failure problems and complexity. Operational problems, including adjustment overshoot, are experienced. Extension or retraction rates are not controllable. Gas actuators require stops at the end of travel to provide protection to the mechanism and avoid a hard landing or shock to the user. In the seating area, it is also desirable to provide controlled shock absorbency. The shock-absorbent characteristics of pneumatic or gas actuators are poor. The damping characteristics of the gas is uncontrollable, which results in overshoot and bounce. Hydraulic systems may employ a gas spring or a mechanical spring for shock absorbency. Mechanical springs suffer from overshoot and bounce. In addition, the spring can bottom-out, resulting in a hard stop or excessive shock to the user. Lastly, it is desirable to provide a sufficiently broad range of travel. For example, current standards suggest that a chair should be adjustable from 16-inches to 20.5-inches above the floor. Such a range is not always possible with existing technology.

A need exists for an improved actuator which will provide a long-term service life, increased reliability and improved operational characteristics at reduced cost from those presently experienced.

SUMMARY OF THE INVENTION

In accordance with the present invention, the aforementioned needs are fulfilled. Essentially, an adjustment mechanism is provided which includes a hydraulic actuator. The actuator has a cylinder, a piston, a piston rod and an expandable chamber. The interior of the cylinder is connected to the expandable chamber through a valve and passageway. With the valve open and under a conversion load, the piston moves into the cylinder and fluid is transferred from the cylinder to the expandable elastomeric chamber where it is stored under pressure. When the valve is next opened, the fluid is forced back into the cylinder, thereby extending the rod from the cylinder under "no-load" or "low-load" conditions. The valve provides for a differential flow rate. Flow from the cylinder to the expandable chamber is restricted and at a lower rate than flow from the expandable chamber to the cylinder. As a result, the actuator extends more rapidly than it retracts.

In further aspects of the invention, the piston and piston rod assembly includes a snap-fit interconnection. The piston functions as a thrust bearing permitting rotation or swiveling action of an article attached to the cylinder. The cylinder and expandable chamber may be positioned within an inner support tube which is telescoped within an outer support tube or base.

In other aspects of the invention, provision is made for absorbing shock. Users of conventional chairs have come to expect shock absorbency, cush or spring action when they sit down. In the preferred embodiment of the subject invention, this expectation is met by a shock absorber ill the form of a compressible foam element disposed in the cylinder.

The adjustment mechanism in accordance with the present invention is capable of providing rapid extension and controlled, reduced rate retraction to improve operation when incorporated into a chair height adjustment mechanism. The system operates at reduced pressures from those previously experienced with pneumatic or gas actuators. Increased reliability and reduced failure rates are achieved. The mechanism is less complex than those devices heretofore provided. The mechanism is capable of providing more than 7-inches of travel and placing a seat 15-inches (or lower) above the floor. The mechanism provides smooth, quiet and reliable operation at a reasonable cost. Shock loads are readily absorbed. The mechanism is readily adapted to or incorporated in existing articles.

DETAILED DESCRIPTION OF THE PREFERRED EMBODIMENT

Figure 1:
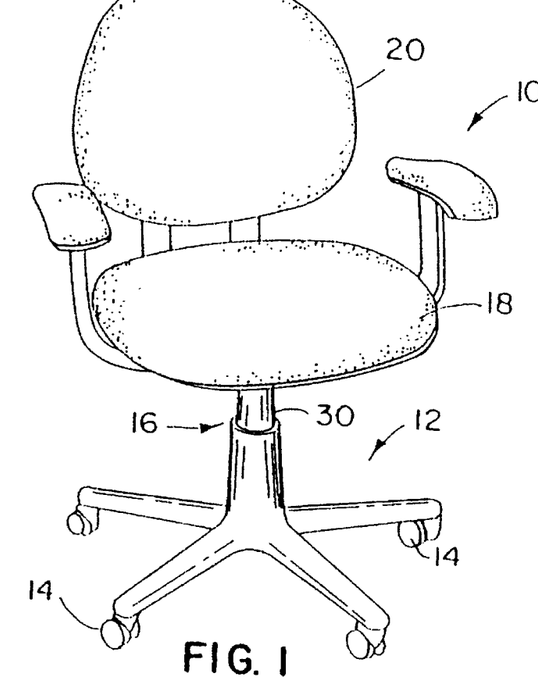
FIG. 1 is a perspective view of a chair incorporating an adjustment mechanism in accordance with the present invention.

A chair incorporating an actuator or height adjustment mechanism in accordance with the present invention is illustrated in FIG. 1 and generally designated by the numeral 10. Chair 10 is representative of one of the many different articles which might incorporate the actuator. The chair includes a base or pedestal 12 supported on casters 14. A height adjustment mechanism 16 is supported on pedestal 12. Mechanism 16 is attached to a seat 18 through a chair control (not shown). A seat back 20 is supported on top of actuator 16 through the control.

Figure 2:
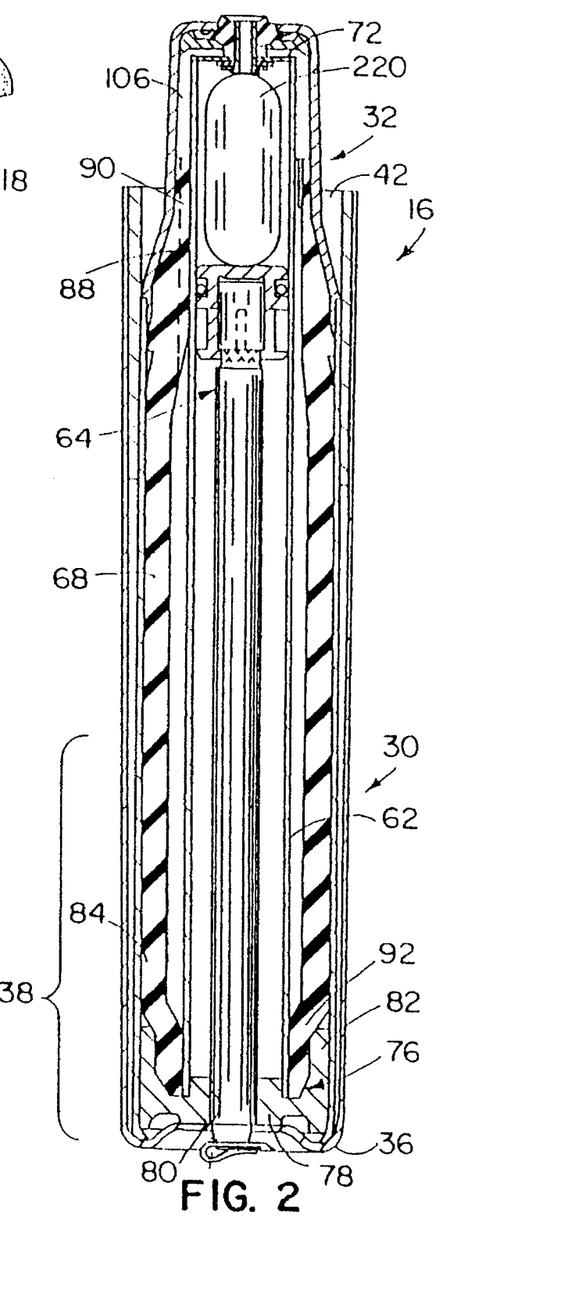
FIG. 2 is an enlarged, cross-sectional view of the adjustment mechanism.
Figure 3:
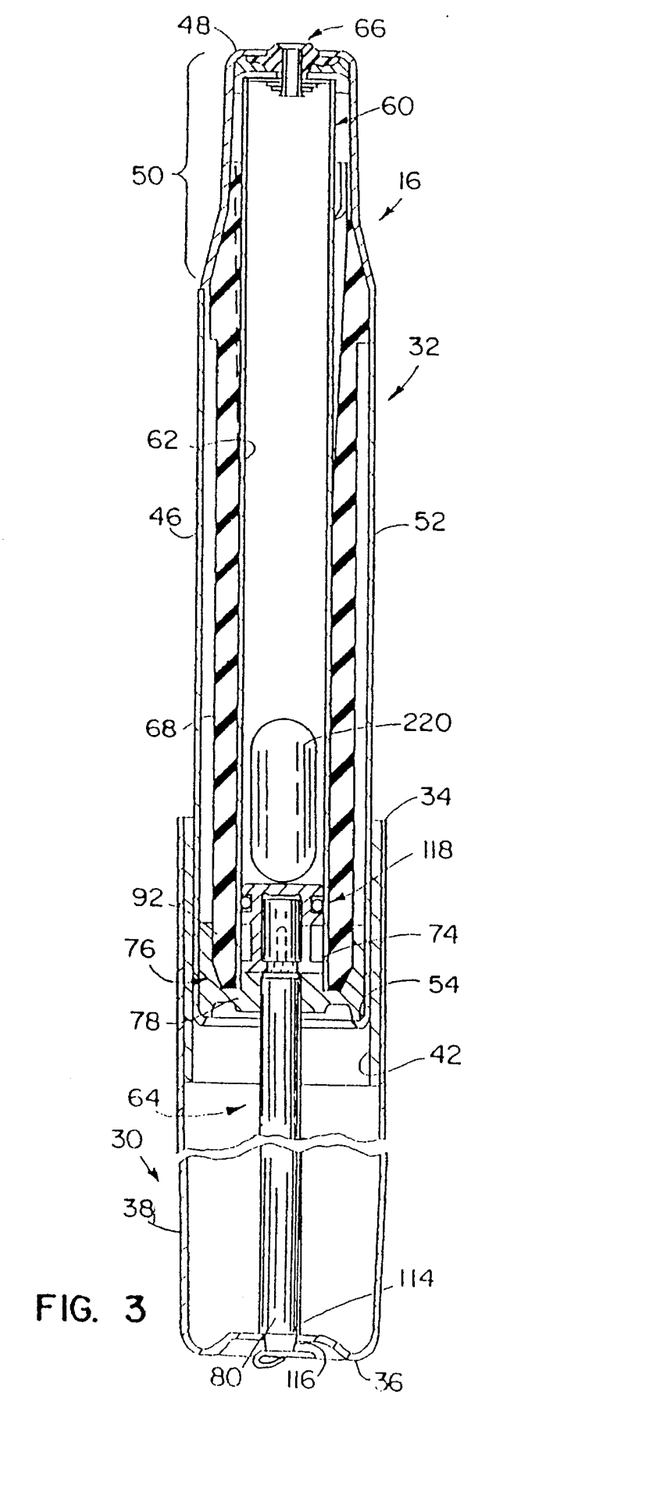
FIG. 3 is an enlarged, cross-sectional view of the adjustment mechanism of FIG. 2 shown in the fully extended position.

As seen in FIGS. 2 and 3, actuator 16 includes an outer hub or support tube 30 which telescopingly receives a column tube subassembly 32. Outer support tube 30 includes an open, upper end 34 and a closed, lower end 36. Tube 30 is preferably fabricated from steel. A lower portion 38 of support tube 30 tapers inwardly towards bottom 36. Support tube 30 is configured to engage a mating, self-locking taper in pedestal 12. The self-locking taper arrangement fixes the chair height adjustment mechanism to the pedestal.

An elongated liner or bearing 42 is press-fitted into the open end 34 of support tube 30. Bearing 42 is preferably manufactured from a self-lubricating plastic material such as an acetal resin. The bearing permits free axial or telescoping and rotational movement of column subassembly 32 into and with respect to tube 30.

Telescoping column tube subassembly 32 includes a column or inner support tube 46 which telescopes into tube 30. Tube 46 includes an upper end 48, an upper tapered section 50 and an elongated section 52 which terminates in a lower end 54. Tube 46, therefore, also includes a self-locking taper section similar to that of outer tube 30 to attach it to a chair seat or other element.

Inner support tube 46 receives and houses an actuator generally designated 60. Actuator 60 includes a cylinder 62, a piston and piston rod subassembly 64, a valve subassembly 66 and an expandable chamber structure or sleeve 68.

Inner cylinder 62 is an elongated, tubular member which is open at its upper end 72. Cylinder 62 and tube 46 are closed at lower ends 74, 54, respectively, by a bushing or end cap 76. As seen in FIGS. 2 and 3, end cap 76 defines a central hub portion 78. Hub portion 78 has an outer diameter which engages and is press-fitted into lower end 74 of cylinder 62. Hub 78 defines a throughbore 80. Bushing 76 further includes a peripheral, generally cylindrical skirt 82. Skirt 82 defines a groove 84.

In the preferred embodiment, expandable chamber structure 68 is an elongated, elastomeric sleeve which has a generally cylindrical shape. A lower end 92 of sleeve 68 is disposed in and captured by groove 84 of bushing 76. The lower end is bonded to an outer surface of cylinder 62 and to an inner surface of skirt 82 of bushing 76 by a suitable adhesive. The adhesive seals the end of the sleeve. The skirt or flange of the bushing and the cylinder provide a backup compression seal. The sleeve is dimensioned so that it must be expanded to fit over cylinder 62. The sleeve is stretched and, hence, under stress to provide an initial preload force. This preload force should be sufficient to return the unoccupied chair to its uppermost position when the valve is opened.

Figure 4:
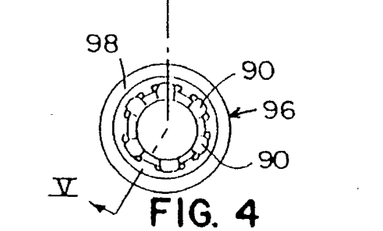
FIG. 4 is an end view of an elastomeric sleeve incorporated in the present invention.
Figure 5:
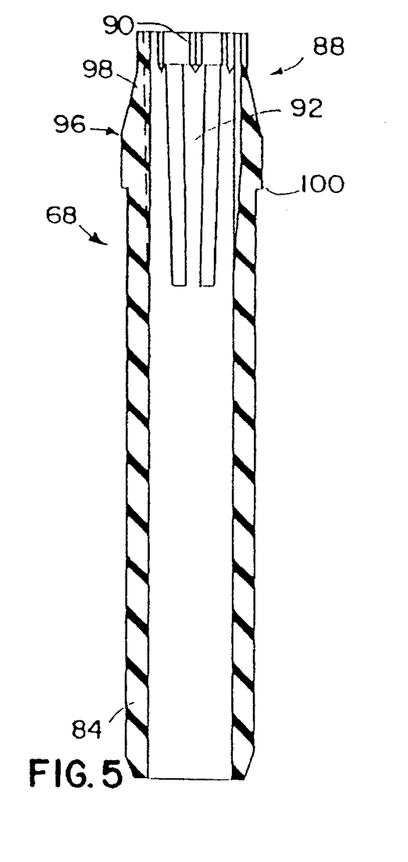
FIG. 5 is a cross-sectional view taken generally along line V—V of FIG. 4

An upper end 88 of sleeve 68 defines a plurality of inlet passages 90. As seen in FIGS. 4 and 5, inlet passages 90 are, in effect, grooves molded in an inner surface of the open end of sleeve 68. Grooves 90 communicate with elongated, enlarged grooves 92 which extend longitudinally along the inner surface of the sleeve. Upper end 88 of the sleeve also includes an enlarged or thickened wall section or band 96 having a tapered upper face 98 and a flat face 100. Wall section 96 is dimensioned to engage the inner surface of tube 46. The thickened area limits or prevents expansion of passages 90 during operation.

As seen in FIGS. 2 and 3, the outer surface of the sleeve 68 is sealed to an inner surface of column support tube 46 at the upper end in the enlarged section. A seal is provided by an adhesive as well as through "compressive" contact with the tapered inner surface or configured portion 48 of support tube 46. The elastomeric material will deform when pressed into contact with the inner surface of the tube to form a seal. As seen in FIGS. 2 and 3, support tube 46 and inner cylinder 62 define an annular space therebetween which receives elastomeric sleeve 68. The interior of the sleeve communicates with a space or passageway 106 between the cylinder and column support tube at their upper ends through inlet passages 90. Fluid entering passages 90 under pressure will expand the sleeve and be stored in the expandable chamber area under pressure. This will provide energy to raise the unoccupied chair when the valve is opened.

As seen in FIG. 5, it is presently preferred that the wall thickness of sleeve 68 become thicker or taper outwardly towards end 84 from a point adjacent face 100. The increase in wall thickness provides a varied force that assists in transferring fluid from the expandable chamber back into the cylinder during extension of the actuator as described below. The sleeve is fabricated from a rubber material having sufficient strength and elasticity to generate the fluid return pressures desired and to withstand the operating pressures which will be experienced. It is presently preferred that the sleeve be molded from an unplasticized natural rubber compound cured with a high sulfur cure (sulfur level between 2.0 and 3.0 phr) and loaded with a rubber grade carbon black. The carbon black ranges in particle size and structure between N330 and N550 with sufficient loading to achieve a tensile modulus of approximately 1400 to 1500 psi as measured per ASTM D-412 using Dumbell Die, C. The compound is cured using standard injection, transfer or compression molding technology. Operating pressures on a unit sized to handle a conventional office chair of the type shown in FIG. 1 would be on the order of 100 psi with peak pressures to 200 to 600 psi statically.

Piston and piston rod subassembly 64 includes an elongated piston rod 112. Rod 112 has a slotted lower end 114 secured to lower end 36 of support tube 30 by a suitable clip 116. A piston subassembly 118, as described in further detail below in connection with FIGS. 14–17, is fixed to the upper end of rod 112. Rod 112 extends through the central bore defined by end cap or closure bushing 76. Piston 118 sealingly engages an inner surface of cylinder 62. In order to move from the fully extended position illustrated in FIG. 3 to the fully retracted position of FIG. 2, hydraulic fluid within cylinder 62 must be allowed to pass from within the cylinder through passage 106 and inlets 90 into the expandable chamber defined by the inner surface of the elastomeric sleeve 66 and the outer surface of the cylinder. Flow of fluid from between these two spaces is controlled by valve subassembly 66.

Figure 6:
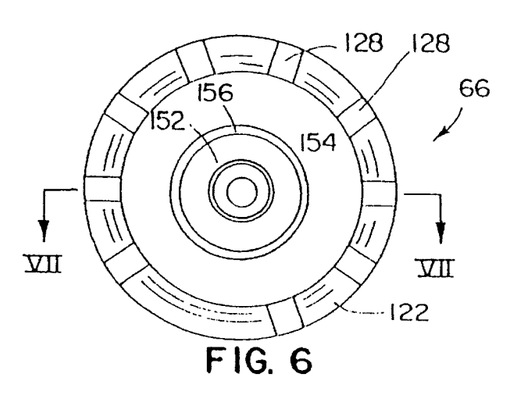
FIG. 6 is a bottom, plan view of a valve assembly incorporated in the present invention.
Figure 7:
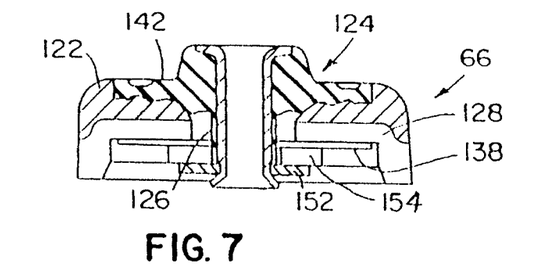
FIG. 7 is a cross-sectional view taken generally along line VII—VII of FIG. 6.
Figure 8:
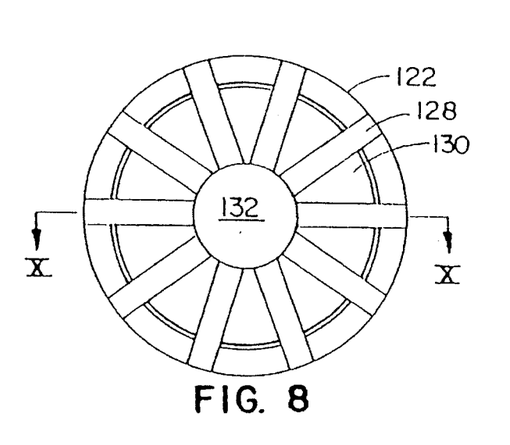
FIG. 8 is a bottom, plan view of a valve seat or channel element incorporated in the assembly of FIG. 6.
Figure 9:
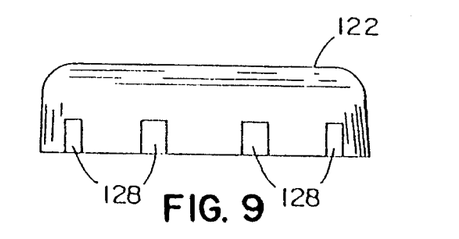
FIG. 9 is a side elevational view of the channel element of FIG. 8.
Figure 10:
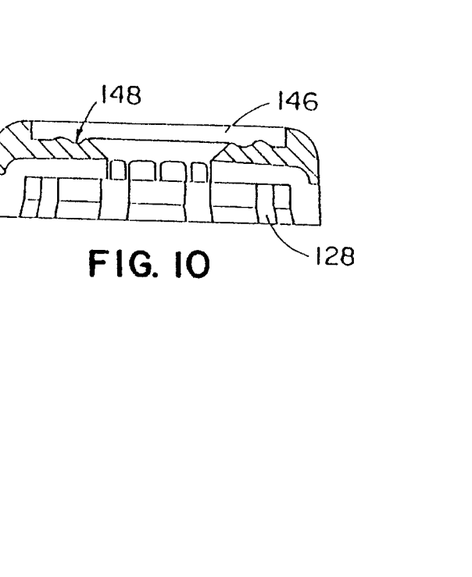
FIG. 10 is a cross-sectional view taken generally along line X—X of FIG. 8.

As shown in FIGS. 6–10, subassembly 66 includes a seat element or member 122 and a bonded diaphragm subassembly 124 having all inner member or stem 126. Seat element 122 defines a plurality of radially extending channels 128. As seen in FIGS. 6, 8 and 10, channels 128 extend radially outwardly along an undersurface 130 and from a central bore or opening 132. Bottom surface 130 defines an abutment surface for a seat washer 138. Inner member or stem 126 is bonded by a suitable adhesive to a rubber diaphragm 142. Diaphragm 142 is generally circular in plan view and is positioned in a diaphragm seat area or recess 146. Recess 146 includes a configured bottom surface 148 which assists in retaining and positioning the diaphragm. Stem 126 extends through central bore 132 of the seat element. A valve element 152 is positioned on stem 126. Valve element 152 is fixed to the stem by lower end 154. A floating element or washer 156 is positioned around stem 126 between valve element 152 and seat washer 138.

Figure 11:
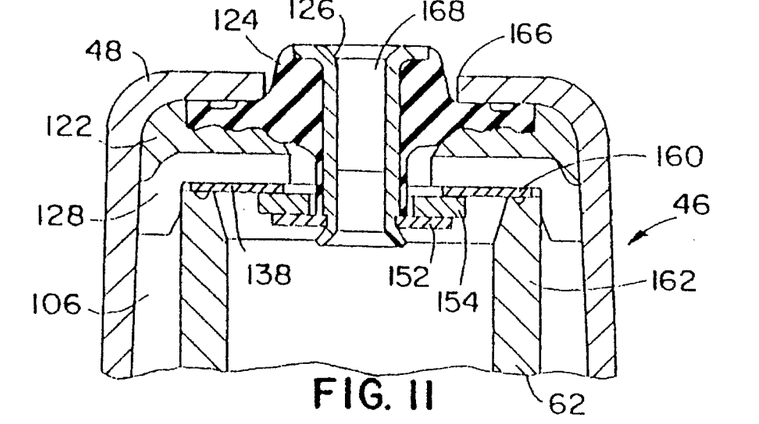
FIG. 11 is an enlarged, fragmentary, cross-sectional view of the actuator showing the valve assembly in the closed position.

Valve assembly 66 is retained at the upper end of the column tube subassembly, as illustrated in FIG. 11. Upper end 162 of cylinder 62 engages and seats against seat washer 138. A suitable sealing adhesive or an elastomeric seal may be disposed within a groove 160 formed in upper end 162. Seat element 122 is dimensioned to engage an inner surface of support tube 46. End 48 of tube 46 is formed to retain the valve assembly and define a central actuating bore 166. Diaphragm 124 forms a seal with the inner surface of tube 46. Member 126 is closed by a sealing rivet 168.

As seen in FIG. 11, when the valve assembly 66 is in the closed position, no communication is permitted between the interior of cylinder 62 and passage 106. Valve element 152 seats against floating washer 154. Washer 154, in turn, seats against the seat washer 138. Fluid cannot flow through channels 128.

Figure 12:
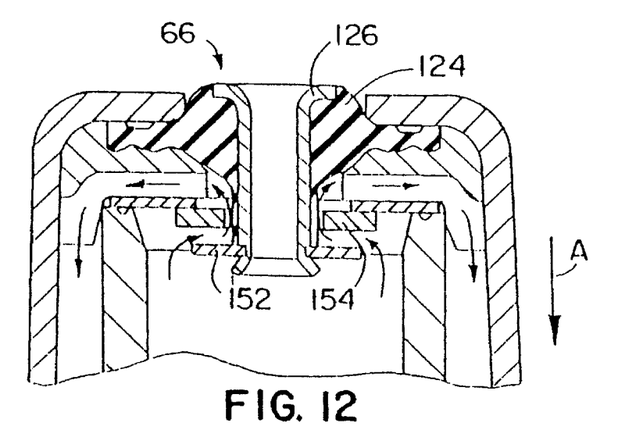
FIG. 12 is an enlarged, fragmentary, cross-sectional view of the actuator showing the valve in the open position with the actuator retracting.

Valve assembly 66 is opened by pushing downwardly on the center hub area of diaphragm 124 at inner member 126. Valve element 152 moves away from floating washer 154. As a load is applied in the direction of arrow A, as shown in FIG. 12, to push column 32 into outer support tube 30 from an extended position, hydraulic fluid within the cylinder will flow around the valve element 152 and through the annular passage defined by washer 154 and the outer surface of inner member 126. Flow rates are restricted to the maximum flow rate of the hydraulic fluid through the restricted orifice. The inner support column 32 will retract or be pushed into outer support tube 30 in a controlled manner at a substantially constant rate with increasing load. The fluid passing into passage 106 enters inlets 90 of the elastomeric sleeve. The elastomeric sleeve will stretch or expand radially outwardly around tube or cylinder 62 to store the fluid under pressure. When column 32 is at the desired partially or fully retracted position, valve 66 is closed by releasing pressure on the diaphragm.

Figure 13:
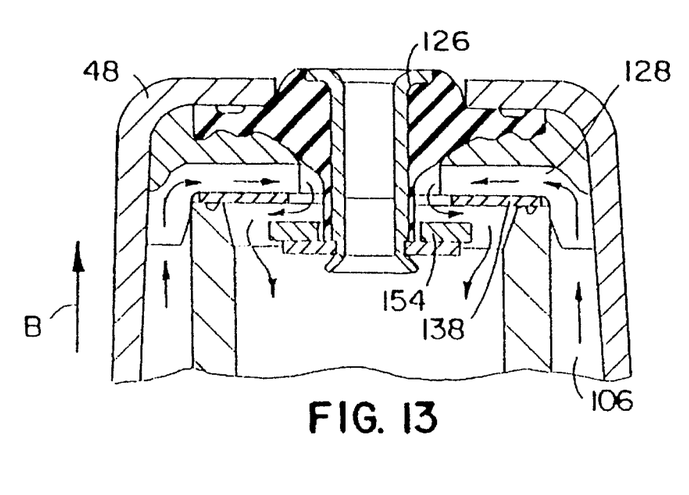
FIG. 13 is an enlarged, fragmentary, cross-sectional view of the actuator with the valve assembly in the open position with the actuator extending.
Figure 14:
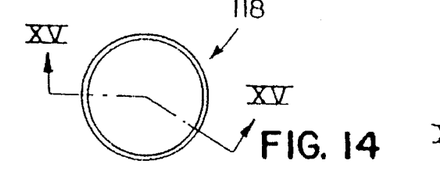
FIG. 14 is an end view of a piston and piston rod assembly incorporated in the present invention.

When it is desired to extend column 32 and raise a chair seat or the like, valve 66 is again opened, as shown in FIG. 13. Support tube 46 will extend in the direction of arrow B. Fluid under pressure is forced out of the expandable chamber by the elastomeric sleeve. The fluid will flow through passage 106, the radial channels 128 and the annular space defined by seat washer 138 and inner member 126. As shown in FIG. 13, floating washer 154 will now move away from seat washer 138 under the influence of the fluid flow. A larger orifice is, therefore, provided for flow of fluid from the elastomeric sleeve or expandable chamber to the interior of cylinder 62 than in the reverse direction. The dimensions of the annular space defined by seat washer 138 are greater than the dimensions of the annular space defined by floating washer 154 and stem 126. With only the load of the chair seat 18 on the cylinder or with only a light load thereon, the cylinder will rapidly extend as fluid under pressure is forced into the inner cylinder. When the desired position is reached, pressure is removed from the diaphragm closing the valve and locking the column in position.

The valve assembly, therefore, provides a directional flow rate which is variable from zero to a maximum in one direction and from zero to a larger maximum when fluid flow is in the opposite direction. The rate for extension of the actuator is considerably faster than the rate for retraction. In addition, the rate for retraction is nearly constant with varying loads. The slower retraction rate gives the user sufficient reflex time to accurately position the seat at a desired height on the downstroke without overshoot. The assembly also provides a soft stop at the end of travel without the need for added cushion parts as are found in pneumatic or gas actuators. The faster extension rate allows the user to make quick, accurate, upward adjustments since the chair seat quickly follows and preferably maintains contact with the user as the user lifts him or herself to the desired height. The geometry of the radial passages 128 and the dimensions of the washers and valve seat control the flow rates.

The channel seat element 122 may be fabricated from a structural plastic, such as a glass-filled Nylon 6/6. The diaphragm is fabricated from rubber material. The inner member is attached to the diaphragm by a suitable adhesive. The hollow inner member facilitates filling of the inner cylinder with hydraulic fluid. Once the cylinder is filled, the member is permanently closed by sealing rivet 168. The floating washer is preferably formed with a plastic material which has sealing and lubricating properties such as a Nylon 66 or a hard thermoplastic elastomer such as polyurethane. The seat washer and valve element are formed from steel.

Figure 15:
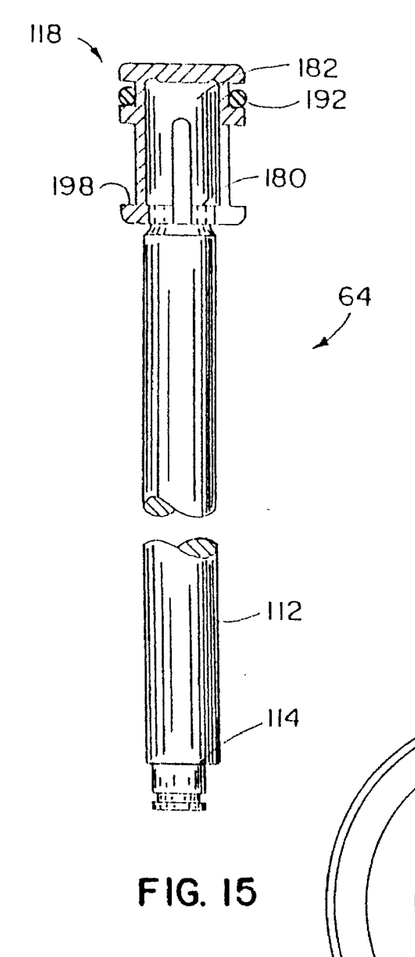
FIG. 15 is a cross-sectional view taken generally along line XV—XV of FIG. 14.
Figure 16:
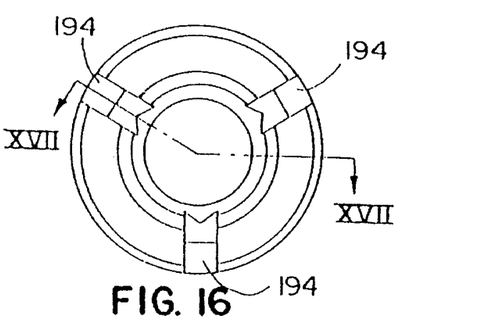
FIG. 16 is an enlarged, bottom view of the piston.
Figure 17:
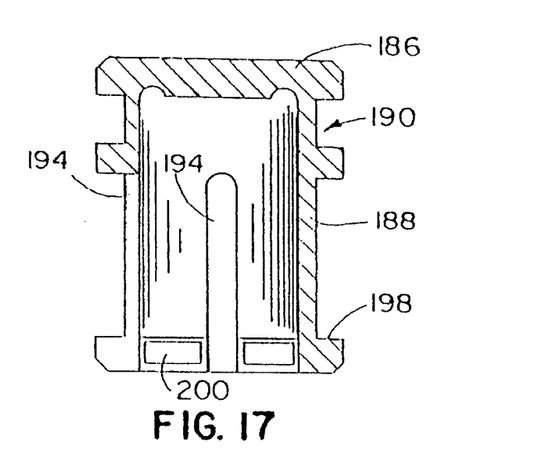
FIG. 17 is a cross-sectional view taken generally along line XVII—XVII of FIG. 16.
Figure 18:
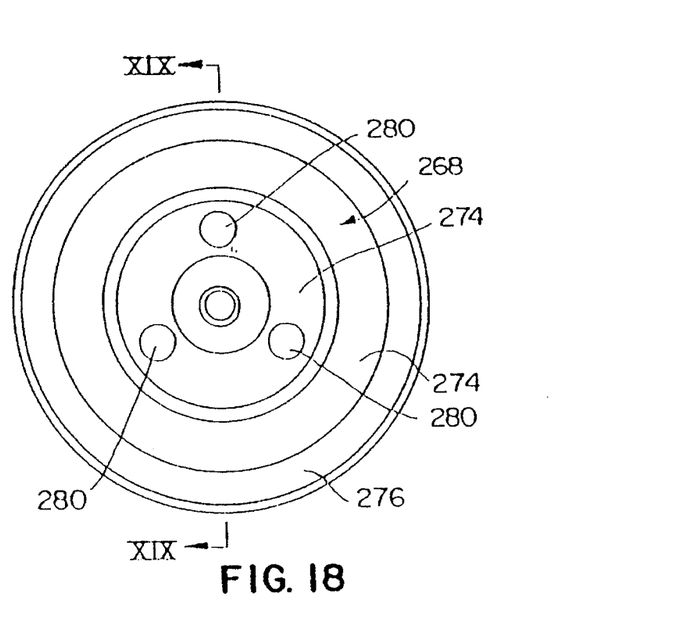
FIG. 18 is a bottom view of a diaphragm assembly incorporated in an alternative valve structure in accordance with the present invention.
Figure 19:
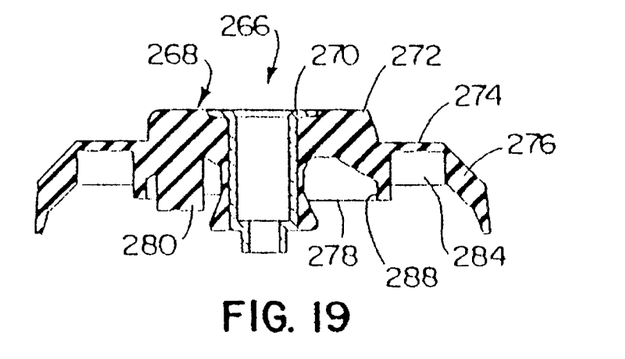
FIG. 19 is a cross-sectional view taken generally along line XIX—XIX of FIG. 18.

The piston and piston rod subassembly 64 is shown in FIGS. 15, 16 and 17. As illustrated, rod 112 is an elongated member which defines a circumferential groove 180 spaced from an upper end 182. Piston 118 has a cup-like configuration in cross section and includes a top 186 and a peripheral skirt 188. Piston 118 further defines a ring groove 190. As shown, an O-ring or other suitable seal 192 is carried in groove 190. Skirt 188 is formed with a plurality of slots 194 formed therethrough. Slots 194 open through the lower end 196 of the piston. The skirt also defines an outer peripheral ring 198 and an inner peripheral ring or bead 200. Piston 118 is molded from a suitable plastic material having flexibility and self-lubricating properties such as an acetal resin. One suitable material is an acetal resin sold by Dupont under the brand name Delrin 500. The piston and piston rod assembly significantly increases the ease of assembly of the actuator and reduces the number of parts necessary. The slit or slotted skirt allows snapping of the piston over the end of rod 112. Bead 200 snaps into retaining groove 180 formed on rod 112. Rod 112, which is preferably fabricated from a cold finished bar 1018 steel material, is inserted into cylinder 62. In the alternative, rod 112 could be fabricated from reinforced engineering resin such as glass filled polyester. When the piston is within the cylinder, ring 198 and the upper portion of the piston engage the inner surface of the cylinder for stability. Seal 192 engages the inner surface to seal the hydraulic fluid into the cylinder space above the piston head.

Piston 118 functions as a thrust bearing permitting the column subassembly to rotate about rod 112. The piston is retained on the rod since the skirt portions are restrained against outward movement by the inner surface of the cylinder. Retaining bead 200 is maintained secure within the retention groove 180. Segmenting of the wall or skirt of the piston allows for the easy snap assembly of the piston and rod. Since the segmented wall cannot flex within the cylinder, the piston is permanently captive on the piston rod. The piston may serve as a limit stop in the fully extended position, as shown in FIG. 3. Since the piston functions as a thrust bearing, the chair seat 18 may swivel about the rod 112 through the piston. As column support tube 46 rotates, piston 118 is free to rotate with it. In addition, the cylinder 62 is free to slide over the piston and, hence, reciprocate into and out of the outer support tube 30.

As shown in FIGS. 2 and 3, end cap or bushing 76 serves as a guide or snubber against the rod 112 to help maintain concentricity. The outside diameter of the flange or skirt 82 is elongated and engages the inner surface of support tube 46. The skirt, therefore, maintains the cylinder centered with respect to the column tube 46. The bottom surface of the end cap 76, as shown in FIG. 2, also functions as a full or retracted limit stop and as a thrust bearing when contacting the bottom of the outer support tube or hub 30.

The actuator in accordance with the present invention is designed for use with an incompressible, hydraulic fluid. It is preferred that the hydraulic fluid used be nontoxic and FDA approved, as well as non-staining and environmentally compatible. The fluid should be recyclable and functional over the normal service temperatures expected for office furniture such as chairs.

The hydraulic fluid is substantially incompressible and, therefore, does not provide any shock-absorbing characteristics when the valve is closed and the actuator is in the desired extended position. In accordance with the present invention, shock-absorbing characteristics are provided by a shock absorber or cush provider 220. Shock absorber element 220 is formed from a closed cell foam which is resistant to compression set and permeability. The foam material, cell size and geometry can all be tailored to provide the desired shock-absorbing characteristics. An applied load or shock on column 32 pressurizes the fluid in cylinder 62 which compresses the shock absorber. Without the shock absorber, the incompressible nature of the fluid would prevent any movement, resulting in a shock to the user.

The use of a compressible foam material in conjunction with a substantially incompressible hydraulic fluid permits optimization of damping and energy dissipation characteristics. Damping can be selected so as to eliminate bounce and overshoot while providing sufficient cushioning apart from cylinder travel. The energy dissipation could be an exponential function of deflection which would optimize deceleration and prevent a harsh or hard stop. It is presently preferred that the shock absorber element 220 be molded as an elongated, generally cylindrical shape from a closed cell urethane foam. The foam can be formed with a urethane film or coating on the exterior surface thereof to seal the element. A presently preferred material is a microcellular urethane with a density of 20 to 50 pounds per cubic foot.

The foam cush provider or element 220 overcomes the damping and overshoot problems heretofore experienced with pneumatic or gas actuators. Harsh bottoming-out problems experienced with mechanical shock absorbers, such as coil springs, are also eliminated. The actuator 16 in accordance with the present invention is reliable in operation. The operating pressures are significantly reduced from those experienced in pneumatic or gas actuators. Seal integrity, reliability and service life are all improved. An achieved reduction in complexity in comparison to prior actuators also reduces cost and improves assembly and maintenance.

An alternative valve structure in accordance with the present invention is illustrated in FIGS. 18-22 and generally designated by the numeral 266. Valve 266 includes a configured diaphragm 268. Diaphragm 268, as with the prior embodiment, is bonded to an inner element 270. Diaphragm 268 defines a central hub section 272, a compression seal 274 and an outer peripheral skirt or lip seal 276. The diaphragm includes an inner annular passage 278 formed therein. Passage 278 communicates with an outer annular channel 284 which is on the other side of a flexible skirt 288. To retain the shape of diaphragm 268, stops 280 are formed in diaphragm 268 which prevent either of the channels 278, 284 from becoming restricted during use.

Figure 20:
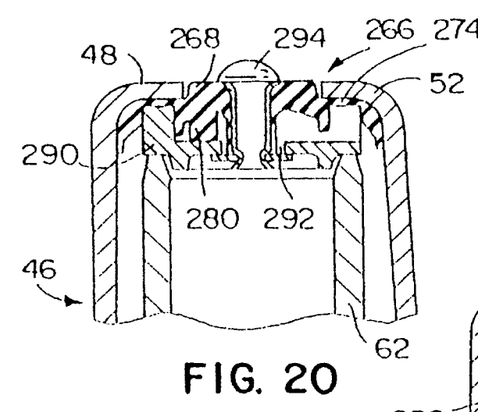
FIG. 20 is an enlarged, fragmentary, cross-sectional view of the actuator showing the alternative valve structure in the closed position.
Figure 21:
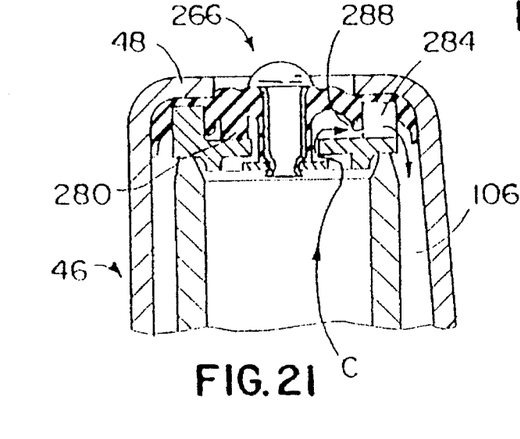
FIG. 21 is an enlarged, fragmentary, cross-sectional view of the actuator showing the alternative valve in the open position with the actuator retracting.

As seen in FIG. 20, diaphragm 268 is positioned on a seat element 290. The seat element is captured against end 48 of inner support tube 46 by the upper end of the inner cylinder 62. Diaphragm portions 274, 276 form a seal with the end of the tube. A valve element 292 is secured to the end of inner member 270. As with the prior embodiment, the cylinder is evacuated and filled with hydraulic fluid and then sealed with a suitable sealing rivet 294. When it is desired to move an extended column 32 to a retracted position, the valve is opened and a load is applied to the center column. As seen in FIG. 21, fluid flows from the interior cylinder 62 to passage 106 by moving around valve element 292 through passage 278 and past skirt 288 to the annular channel 284. The skirt is restricted from flexing outwardly by seat element 290 and, hence, fluid flow into channel 284 is limited to that allowed by the gap between the lower edge of the skirt 288 and the seat element 290, as shown by the arrows C in FIG. 21. The restricted flow controls the rate of retraction of the column into the outer support tube.

Figure 22:
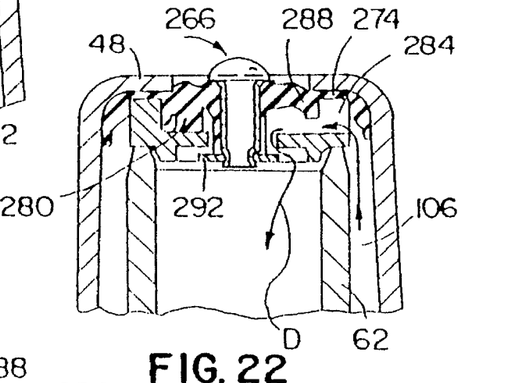
FIG. 22 is an enlarged, fragmentary, cross-sectional view of the actuator showing the alternative valve in the open position with the actuator extending.

When it is desired to extend the element, the valve is opened as shown in FIG. 22. Fluid under pressure from the energy sleeve passes in the direction of arrows D through passage 106 and into radial channel 284. Skirt 288 flexes inwardly increasing the flow passage area and, hence, increasing the flow rate obtainable from passage 106 to the interior of cylinder 62. A variable flow rate which is directionally dependent is, therefore, achieved with the valve assembly illustrated in FIGS. 18–22.

The actuator 16 in accordance with the present invention is readily adaptable to articles of furniture. The actuator provides reliable height adjustment for a conventional chair. The outer support tube or hub 30 is easily used with existing pedestal assemblies. The upper end of column subassembly 32 is readily attached to the undersurface of a chair or chair control. Valve 66 may be actuated in conventional fashion with an external lever. Valve movement is linear. In a typical installation, an external Lever would apply an arcuate motion to the sealing rivet or outer surface of the valve. This motion would be controlled by the seated user, who applies a control force to a lever with a mechanical advantage in the range of 5–10:1. An external force of 5 to 10 pounds would be desired with a lever motion of approximately 1 inch. The diaphragm and control lever are preferably constructed so that the force required to open the valve increases with increasing valve travel.

The assembly provides a rate of displacement which is easily controlled by the user. The assembly extends at a rate faster than it retracts for precise positioning and control in either direction. The valve assembly provides positive sealing to maintain the desired seat position under all expected conditions. The valve arrangement provides a graduated or regulated fluid flow rate with the orifice geometry determining the relationship between the degree of valve displacement and the fluid flow rate. Chair movement is limited to safe values at full valve displacement by the orifice controlled fluid flow rate and the valve may be opened under any normal load conditions. The valve arrangement provides a positive locking seal for improved reliability. The elastomeric sleeve is efficient due to its high energy density. The sleeve is selected to provide sufficient pressure or restoring force to the fluid to return an unoccupied seat to its uppermost position. The piston and piston rod configuration provides for quick and easy assembly. The configuration insures that the piston remains captured on the rod and also permits the assembly to serve as a rotational thrust bearing. This eliminates the need for a separate element in the assembly. Shock-absorbing characteristics may be tailored to match specific requirements through the shock absorber 220. Service life is increased over pneumatic or gas cylinders due, at least in part, to the lower operating pressures and lubricating properties of the hydraulic fluid. The hydraulic fluid experiences normal static pressures of approximately 80 to 125 psi when compared to compressed gas actuators which experience static pressures of over 600 psi. Improved position control and feel under motion are obtained through the subject assembly since the rate can be modulated from full off to full open by the user. Overshoot and bounce are virtually eliminated. Loss of serviceability due to leaks is greatly reduced. Higher reliability is obtained due to fewer parts, less precision required in their manufacture, a reduced number of dynamic and static seals and the lower operating pressure. Structural and functional elements have been integrated into the actuator, thereby reducing the number of parts significantly. An up to fifty percent reduction in the number of parts over pneumatic actuators is obtained. This results in a significantly lower cost to the overall chair assembly as well.

In view of the above description, those of ordinary skill in the art may envision various modifications which would not depart from the inventive concepts disclosed herein. As a result, the above description should be considered as only that of the preferred embodiment. The true spirit and scope of the present invention may be determined by reference to the appended claims.

The embodiments of the invention in which an exclusive property or privilege is claimed are defined as follows:

1. An adjustable column assembly, said assembly comprising:
    an outer support tube having a lower end and an open, upper end;
    a column tube subassembly telescopingly disposed within said outer support tube, said subassembly including:
    an inner support tube;
    a cylinder within said inner support tube;
    a piston within said cylinder;
    a piston rod connected to said piston at one end and to said outer support tube at its other end so that said cylinder may move into and out of said outer support tube on said piston;
    an elastomeric sleeve surrounding said cylinder, said sleeve and said cylinder defining an expandable chamber having an inlet;
    valve means between said cylinder and the inlet to said expandable chamber for controlling the flow of fluid between the cylinder and the expandable chamber so that the flow rate from the cylinder to the chamber is different than the flow rate from the chamber to the cylinder.

2. An adjustable cylinder assembly as defined by claim 1 wherein said elastomeric sleeve is generally cylindrical in shape and has an end which defines said inlet with said cylinder.

3. An adjustable cylinder assembly as defined by claim 2 wherein said sleeve has a wall having a tapered cross section.

4. An adjustable cylinder assembly as defined by claim 3 wherein an outer surface of said sleeve at its inlet end is in sealing contact with an inner surface of said inner support tube.

5. An adjustable cylinder assembly as defined by claim 4 wherein said column tube subassembly further includes a bushing joined to said cylinder, said bushing defining a control hub surrounding said piston rod.

6. An adjustable cylinder assembly as defined by claim 5 wherein said bushing further defines an outer skirt, said skirt and said hub defining a groove, said sleeve and said cylinder being disposed within said groove.

7. An adjustable cylinder assembly as defined by claim 1 further including a compressible, shock-absorbing element disposed within said cylinder.

8. An adjustable cylinder assembly as defined by claim 7 wherein said shock-absorbing element is a closed-cell foam element.

9. An adjustable cylinder assembly as defined by claim 1 wherein said piston rod defines a circular groove adjacent one end.

10. An adjustable cylinder assembly as defined by claim 9 wherein said piston includes a segmented skirt defining a plurality of skirt portions separated by slots.

11. An adjustable cylinder assembly as defined by claim 10 wherein each of said skirt portions defines a bead on an inner surface thereof, said beads configured to be received by said circular groove so that the piston may be snapped over said piston rod one end, and the piston and rod may then be inserted into and be captured by said cylinder.

12. An adjustable cylinder assembly as defined by claim 11 wherein said piston rotates on said piston rod.

13. An adjustable cylinder assembly as defined by claim 12 wherein said skirt defines a ring groove and said assembly further includes an O-ring within said ring groove.

14. An adjustable cylinder assembly as defined by claim 6 wherein said piston rod defines a circular groove adjacent one end.

15. An adjustable cylinder assembly as defined by claim 14 wherein said piston includes a segmented skirt defining a plurality of skirt portions separated by slots.

16. An adjustable cylinder assembly as defined by claim 15 wherein each of said skirt portions defines a bead on an inner surface thereof, said beads configured to be received by said circular groove so that the piston may be snapped over said piston rod one end, and the piston and rod may then be inserted into and be captured by said cylinder.

17. An adjustable cylinder assembly as defined by claim 16 wherein said piston rotates on said piston rod.

18. An adjustable cylinder assembly as defined by claim 17 wherein said skirt defines a ring groove and said assembly further includes an O-ring within said groove.

19. An adjustable cylinder assembly as defined by claim 18 further including a compressible, cellular foam element disposed within said cylinder.

20. An adjustable cylinder assembly as defined by claim 1 wherein said valve means comprises:
   a valve seat element defining a valve bore, a valve seat and at least one passage connected to said bore;
   a valve diaphragm on said valve seat element; and
   a valve element connected by said valve diaphragm and moveable by said diaphragm away from and against said valve seat.

21. An adjustable cylinder assembly as defined by claim 20 wherein said valve means further comprises a floating element between said valve element and said valve seat, said floating element restricting flow from said cylinder through said passage to said expandable chamber and moving away from said seat to permit increased flow in the opposite direction.

22. An adjustable cylinder assembly as defined by claim 21 wherein said valve seat member defines a plurality of radially extending passages.

23. An adjustable cylinder assembly as defined by claim 22 wherein said valve element comprises a stem member bonded to said diaphragm.

24. An adjustable cylinder assembly as defined by claim 23 wherein said piston rod defines a circular groove adjacent one end.

25. An adjustable cylinder assembly as defined by claim 24 wherein said piston includes a segmented skirt defining a plurality of skirt portions separated by slots.

26. An adjustable cylinder assembly as defined by claim 25 wherein each of said skirt portions defines a bead on an inner surface thereof, said beads configured to be received by said circular groove so that the piston may be snapped over said piston rod one end, and the piston and rod may then be inserted into and be captured by said cylinder.

27. An adjustable cylinder assembly as defined by claim 26 wherein said piston rotates on said piston rod.

28. An adjustable cylinder assembly as defined by claim 27 wherein said skirt defines a ring groove and said assembly further includes an O-ring within said ring groove.

29. An adjustable cylinder assembly as defined by claim 21 wherein said elastomeric sleeve is generally cylindrical in shape and has an end which has at least one groove to define said inlet with said cylinder.

30. An adjustable cylinder assembly as defined by claim 29 wherein said column tube subassembly further includes a bushing joined to said cylinder, said bushing defining a central hub surrounding said piston rod.

31. An adjustable cylinder assembly as defined by claim 30 wherein said bushing further defines an outer skirt, said outer skirt and said hub defining a groove, said sleeve and said cylinder being disposed within said groove.

32. An adjustable cylinder assembly as defined by claim 20 wherein said diaphragm defines a flexible skirt disposed within said passage, said skirt restricting flow through said passage in one direction but flexing to permit increased flow in the opposite direction.

33. An adjustable cylinder assembly as defined by claim 32 wherein said diaphragm further defines a compression seal disposed between said valve seat element and said inner support tube.

34. An adjustable cylinder assembly as defined by claim 33 wherein said diaphragm further defines a peripheral lip seal engaging an inner surface of said inner support tube.

35. A height adjustment device for raising, lowering and locking a chair seat and the like in position with respect to a base, said device comprising:
   a support tube;
   a cylinder disposed within said support tube, said tube and cylinder defining an annular space;
   a piston disposed within said cylinder;
   a rod connected to said piston at one end and extending from said cylinder, said piston and cylinder being rotatable on said rod;
   an expandable chamber within said annular space for receiving and pressuring a fluid;
   passage means between said cylinder and said chamber for defining a passage and allowing flow of fluid between the cylinder and chamber as said piston moves within said cylinder; and
   flow control means within said passage for controlling flow of fluid between the cylinder and expandable chamber, said flow control means allowing flow between said cylinder to said chamber at different rates depending on the direction of flow.

36. A height adjustment device as defined by claim 35 further including an outer support tube having an open end and a closed end, said support tube being disposed within said outer support tube.

37. A height adjustment device as defined by claim 35 wherein said expandable chamber comprises an elastomeric sleeve within said annular space surrounding said cylinder.

38. A height adjustment device as defined by claim 37 wherein said elastomeric sleeve defines an inlet opening into said annular space, said passage means connecting said inlet with said cylinder.

39. A height adjustment device as defined by claim 38 wherein said flow control means comprises a valve disposed within said passage, said valve including a valve seat member defining a bore, a seat and a valve passage, a diaphragm on said valve seat member and a valve element connected by said diaphragm, so that movement of the diaphragm moves said valve element away from said valve seat permitting fluid flow between the cylinder and the expandable chamber.

40. A height adjustment device as defined by claim 39 wherein said valve further includes flow restrictor means for restricting flow from said cylinder to said expandable chamber.

41. A height adjustment device as defined by claim 40 wherein said valve includes a stem element extending from said diaphragm and wherein said valve element is fixed to said stem element.

42. A height adjustment device as defined by claim 41 wherein said flow restrictor means comprises a floating element shiftably mounted on said stem element between said seat and said valve element.

43. A height adjustment device as defined by claim 41 wherein said flow restrictor means comprises a flexible skirt joined to said diaphragm and disposed within said valve passage.

44. A height adjustment device as defined by claim 40 further comprising a compressible, shock absorber disposed within said cylinder.

45. A height adjustment device as defined by claim 44 wherein said shock absorber is an expanded foam element.

46. A height adjustment device as defined by claim 35 wherein said piston rod defines a circular groove adjacent an end, said piston being generally cup-like in cross section and having an expandable skirt defining a bead disposed within said groove so that the piston can be pushed onto the rod and then inserted into the cylinder.

47. A height adjustment device as defined by claim 46 wherein said piston skirt defines a plurality of slots.

48. A height adjustment device as defined by claim 47 further comprising a bushing positioned at an end of said cylinder and defining a rod bore, said rod extending through said rod bore.

49. A height adjustment device as defined by claim 48 wherein said expandable chamber comprises an elongated, elastomeric sleeve surrounding said cylinder, said sleeve having a first end defining an inlet and a second, sealed end.

50. A height adjustment device as defined by claim 49 wherein a portion of said sleeve at said first end has a thicker cross section and an angled face.

51. A height adjustment device as defined by claim 50 wherein said support tube engages said sleeve at said thicker cross section.

52. A height adjustment device as defined by claim 51 wherein said sleeve has a wall thickness which tapers outwardly from the thicker cross section portion towards said sealed end.

53. A height adjustment device as defined by claim 52 further including an outer support tube having an open end and a closed end, said support tube being disposed within said outer support tube.

54. A height adjustment device as defined by claim 53 wherein said flow control means comprises a valve disposed within said passage, said valve including a valve seat member defining a bore, a seat and a valve passage, a diaphragm on said valve seat member and a valve element connected by said diaphragm, so that movement of the diaphragm moves said valve element away from said valve seat permitting fluid flow between the cylinder and the expandable chamber.

55. A height adjustment device as defined by claim 54 further comprising a compressible element disposed within said cylinder and which is compressed by increased fluid pressures within said cylinder.

56. A height adjustment device as defined by claim 54 wherein said valve further includes flow restrictor means for restricting flow from said cylinder to said expandable chamber.

57. A height adjustment device as defined by claim 56 wherein said valve includes a stem element extending from said diaphragm and wherein said valve element is fixed to said stem element.

58. A height adjustment device as defined by claim 57 wherein said flow restrictor means comprises a floating member shiftably mounted on said stem element between said seat and said valve element.

59. A height adjustment device as defined by claim 40 wherein said flow restrictor means comprises a flexible skirt joined to said diaphragm and disposed within said valve passage.

60. A height adjustment device as defined by claim 59 further comprising a foam shock absorber disposed within said cylinder.

61. A hydraulic actuator comprising:
 a cylinder having a first end and a second end;
 a closure disposed within said second end, said closure defining a rod bore;
 a rod extending into said cylinder through said rod bore;
 a piston on said rod, said piston being within said cylinder;
 an expandable, elastomeric sleeve surrounding said cylinder, said sleeve defining an inlet;
 a passage connecting said sleeve inlet with the cylinder; and
 valve means within said passage for controlling flow of a hydraulic fluid from said cylinder to said sleeve inlet, said valve means being moveable from a closed position to an open position and allowing flow from the cylinder to the sleeve inlet at a rate less than the rate of flow from said sleeve inlet to said cylinder.

62. A hydraulic actuator as defined by claim 61 further comprising a compressible member within said cylinder between the piston and the valve means.

63. A hydraulic actuator as defined by claim 61 wherein said piston is cup-shaped in cross section and defines a skirt having an interior bead.

64. A hydraulic actuator as defined by claim 63 wherein said piston rod defines a groove which receives said bead.

65. A hydraulic actuator as defined by claim 64 wherein said skirt is segmented and said piston is sufficiently flexible to permit the bead to expand over the end of the rod and then be received in said groove.

66. A hydraulic actuator as defined by claim 65 further comprising a compressible member within said cylinder which can be compressed by hydraulic fluid within said cylinder when the valve is closed and the rod is urged into said cylinder.

67. A piston/cylinder actuator comprising:
 an elongated cylinder;
 a bushing disposed in an end of said cylinder, said bushing defining a central bore;
 an elongated rod extending through said bore and into said cylinder, said rod defining a circumferential groove adjacent an end thereof within said cylinder; and a piston, said piston having an expandable skirt and a retention bead thereon, said piston fitting over said rod with said bead disposed in said groove and said piston being held captive on said rod by contact with the inner surface of said cylinder.

68. An actuator as defined by claim 67 wherein said skirt defines a plurality of slots separating said skirt into segments.

69. An actuator as defined by claim 68 further including a guide ring on said skirt adjacent a lower end thereof.

70. An actuator as defined by claim 69 wherein said piston defines a ring groove and said actuator further includes an O-ring seal within said groove.

71. A hydraulic actuator, comprising:

a cylinder including incompressible fluid therein;

a piston disposed within said cylinder;

a rod connected to said piston;

a valve on said cylinder for controlling flow of the incompressible fluid into and out of the cylinder; and a compressible shock absorber disposed within said cylinder and immersed in the incompressible fluid such that said incompressible fluid compresses the compressible shock absorber volumetrically when the incompressible fluid is loaded.

72. A hydraulic actuator as defined by claim 71 wherein said shock absorber is an expanded foam element.

73. An adjustable column assembly for a chair or the like comprising:

an outer support tube having an open end; and a column tube subassembly telescopingly disposed within said outer support tube, said subassembly adapted to move into and out of said outer support tube, said subassembly including:

an inner support tube;

a cylinder within said inner support tube;

a piston within said cylinder;

a piston rod connected to said piston at one end so that said cylinder may move into and out of said outer support tube on said piston;

an elastomeric sleeve surrounding said cylinder, said sleeve and said cylinder defining an expandable chamber having an inlet, said sleeve having a preload force capable of extending said cylinder to its outermost position when said chair is unoccupied; and valve means between said cylinder and the inlet to said expandable chamber for controlling the flow of fluid between the cylinder and the expandable chamber.

* * * * *

UNITED STATES PATENT AND TRADEMARK OFFICE
CERTIFICATE OF CORRECTION

PATENT NO. : 5,511,759
DATED : April 30, 1996
INVENTORS : DeKraker et al.

It is certified that error appears in the above-identified patent and that said Letters Patent is hereby corrected as shown below:

Column 1, line 19;
  "HEIGTADJUSTERS" should be --HEIGHT ADJUSTERS--.

Column 5, line 51;
  "all" should be --an--.

Column 9, line 30;
  "Lever" should be --lever--.

Column 11, line 60;
  "stern" should be --stem--.

Signed and Sealed this

Twenty-ninth Day of October 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,511,759
DATED : April 30, 1996
INVENTOR(S) : DeKraker, et. al.

It is certified that error appears in the above-indentified patent and that said Letters Patent is hereby corrected as shown below:

Title page, item [73], Assignee: should read--Steelcase Inc., Grand Rapids, Mich. and The Lord Corporation, Erie, Pennsylvania--.

Signed and Sealed this

Twenty-eighth Day of January, 1997

Attest:

BRUCE LEHMAN

Attesting Officer    Commissioner of Patents and Trademarks